No. 715,869. Patented Dec. 16, 1902.
G. E. RICKEL & J. W. POTTER.
GATE HINGE.
Application filed Aug. 19, 1902.
(No Model.)
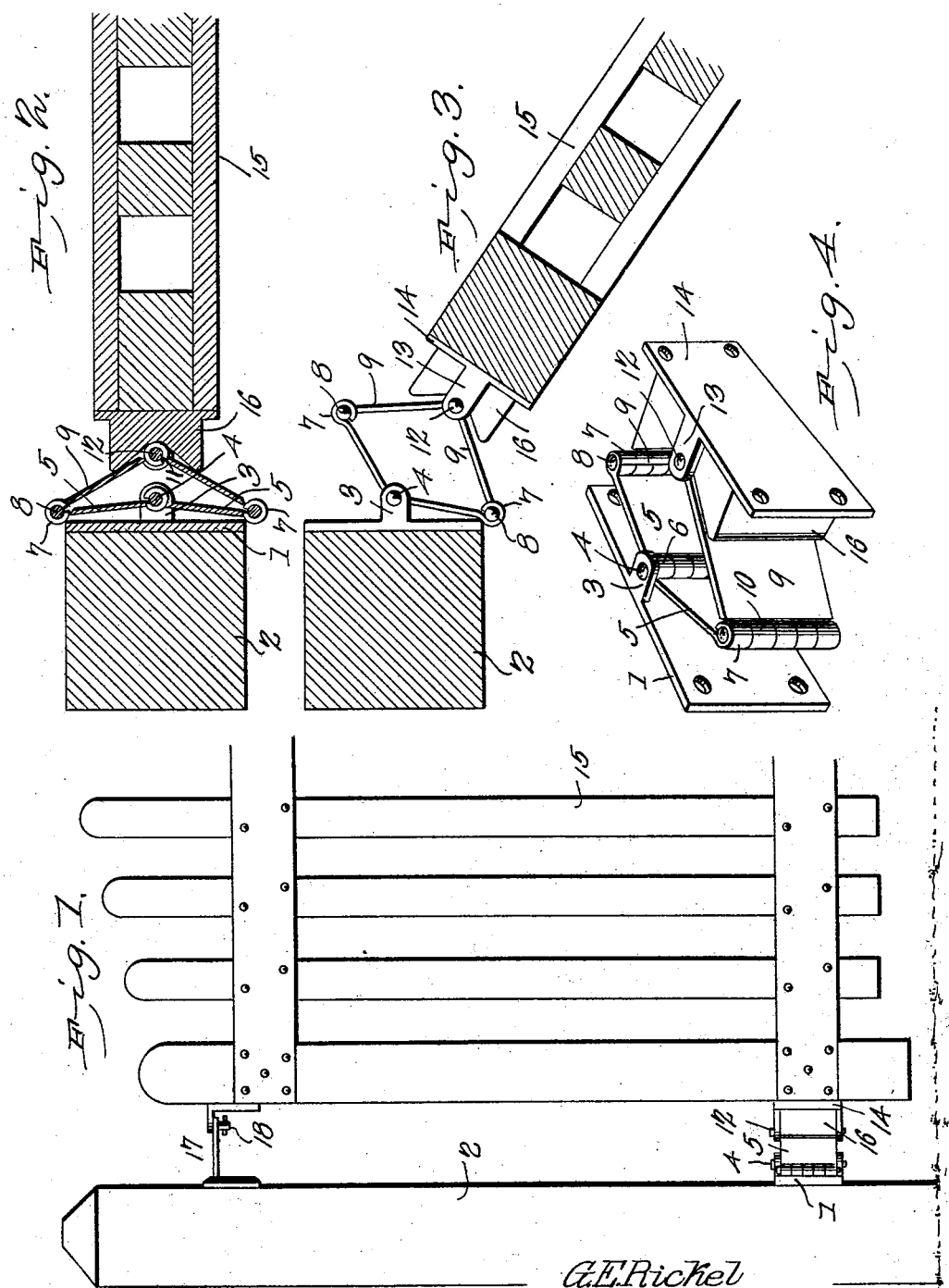
Witnesses
E. F. Stewart
J. F. Riley
G. E. Rickel
J. W. Potter
Inventors
by C. A. Snow & Co.
Attorneys
THE NORRIS PETERS CO., PHOTO-LITHO., WASHINGTON, D. C.

UNITED STATES PATENT OFFICE.

GEORGE E. RICKEL AND JOSEPH W. POTTER, OF OKETO, KANSAS.

GATE-HINGE.

SPECIFICATION forming part of Letters Patent No. 715,869, dated December 16, 1902.

Application filed August 19, 1902. Serial No. 120,236. (No model.)

*To all whom it may concern:*

Be it known that we, GEORGE E. RICKEL and JOSEPH W. POTTER, citizens of the United States, residing at Oketo, in the county of Marshall and State of Kansas, have invented a new and useful Gate-Hinge, of which the following is a specification.

The invention relates to improvements in gate-hinges.

The object of the present invention is to improve the construction of gate-hinges and to provide a simple, inexpensive, and efficient one of great strength and durability designed to be applied to the ordinary swinging gate and hinge-post and capable of enabling a gate to swing open in either direction and of causing the same to close automatically when released.

The invention consists in the construction and novel combination and arrangement of parts hereinafter described, illustrated in the accompanying drawings, and pointed out in the claims hereto appended.

In the drawings, Figure 1 is a side elevation of a portion of a gate provided with a hinge constructed in accordance with this invention. Fig. 2 is a horizontal sectional view illustrating the position of the parts when the gate is closed. Fig. 3 is a similar view illustrating the arrangement of the parts when the gate is partly open. Fig. 4 is a detail perspective view of the hinge, the leaves being slightly separated to illustrate the construction more clearly.

Like numerals of reference designate corresponding parts in all the figures of the drawings.

1 designates a hinge-post plate or bracket designed to be bolted or otherwise secured to a post 2 and provided at its top and bottom with upper and lower perforated ears 3, receiving a pintle 4 for hinging rear leaves 5 to the bracket or plate. The rear leaves 5 are provided at their inner adjacent ends with eyes 6 and have their upper and lower edges located between the upper and lower perforated ears 3, and the outer edges of the rear leaves are provided with eyes 7, which receive pintles 8 for hinging the said rear leaves to a pair of front leaves 9. The front leaves 9 are provided at their outer ends with eyes 10 for the reception of the said pintles 8, and they are also provided with inner eyes 11, which receive a front pintle 12. The front pintle 12 passes through perforated ears 13 of a plate or bracket 14, which is designed to be screwed, bolted, or otherwise secured to a gate 15. The rear leaves are arranged approximately in the same plane when the gate is closed and are supported at their inner ends by the bracket or plate 1. The front leaves are longer than the rear leaves and are arranged at an angle to each other, forming an approximately V-shaped front portion. The V-shaped front portion of the hinge is supported by a lug or enlargement 16 of the bracket or plate 14, the said lug or enlargement being provided with a V-shaped recess to form a seat for the front leaves. When the gate is opened in either direction, the front leaf at the side on which the gate opens or to which the gate swings oscillates and causes the lower end of the gate to swing upward and outward, whereby the gate will close by gravity when released. The rear leaf at this side of the gate remains in contact with the hinge-post bracket or plate and affords a firm support for the adjacent front leaf. The other rear leaf swings away from the hinge bracket or plate, and the corresponding front leaf is carried outward by the gate, as clearly shown in Fig. 3. By this construction the gate is adapted to close automatically when it is opened in either direction. The leaves are compactly arranged and enable the hinge to be readily applied to any ordinary gate without altering the construction of the same, and the gate is permitted to swing freely when opening and closing. Any desired form of upper hinge 17 may be employed; but a key 18 or other suitable fastening device is preferably provided to prevent the parts of the upper hinge from separating when the bottom of the gate is swung upward and outward.

It will be seen that the gate-hinge is exceedingly simple and inexpensive in construction, that it possesses great strength and durability, and that its parts are compactly arranged and will enable it to be applied to the ordinary swinging gate. It will also be clear that it will cause the gate to close automatically when the same is released and that as the front leaves are longer than the rear leaves the hinge cannot close completely and will not become accidentally locked and refuse to operate.

What we claim is—

1. A gate-hinge comprising a securing-plate, a pair of upright rear leaves hinged together at their inner ends and to said plate and arranged to rest against a post at their outer ends and disposed approximately in the same plane when the parts are in their normal position, a pair of forwardly-converging upright front leaves hinged together at their inner ends and at their outer ends to the outer ends of the rear leaves and being of a greater length than the same to prevent the front and rear leaves from closing against each other and becoming locked, and a securing-plate to which the front leaves are pivotally connected at their inner ends, substantially as described.

2. A hinge of the class described comprising a bracket or plate designed to be secured to a suitable support, a pair of rear leaves hinged at their adjacent ends to the bracket or support and having their outer ends normally arranged against the same, a pair of converging front leaves of greater length than the rear leaves, hinged at their outer ends to the rear leaves, and a bracket hinged to the inner ends of the front leaves and provided with a V-shaped seat for the reception of the same, substantially as described.

In testimony that we claim the foregoing as our own we have hereto affixed our signatures in the presence of two witnesses.

GEORGE E. RICKEL.
JOSEPH W. POTTER.

Witnesses:
R. L. McALLISTER,
Z. H. MOON.